United States Patent [19]

Nakayama

[11] Patent Number: 5,253,178
[45] Date of Patent: Oct. 12, 1993

[54] WIRE-TYPE ELECTRICAL DISCHARGE MACHINING METHOD AND APPARATUS

[75] Inventor: Yoshiro Nakayama, Aichi, Japan

[73] Assignee: Mitsubishi Denki K.K., Tokyo, Japan

[21] Appl. No.: 489,632

[22] Filed: Mar. 7, 1990

[30] Foreign Application Priority Data

Aug. 25, 1989 [JP] Japan ............................... 1-219837

[51] Int. Cl.⁵ .......................... G06F 15/46; B23P 1/08
[52] U.S. Cl. ............................. 364/474.04; 219/69.12; 219/69.13
[58] Field of Search ...................... 364/474.04, 474.22, 364/474.25, 474.26; 219/69.12, 69.13, 69.17; 83/167, 651.1; 204/206, 297 R

[56] References Cited

U.S. PATENT DOCUMENTS

| | | |
|---|---|---|
| 3,891,819 | 3/1975 | Ullmann et al. |
| 4,059,788 | 11/1977 | Vasiliev et al. ..................... 318/577 |
| 4,484,052 | 11/1984 | Inoue ..................................... 83/167 |
| 4,544,819 | 10/1985 | Nomura et al. .................. 219/69.12 |
| 4,547,646 | 10/1985 | Briffod ............................. 219/69.12 |
| 4,673,787 | 11/1987 | Inoue. |
| 4,745,256 | 5/1988 | Girardin ............................. 83/651.1 |
| 4,792,889 | 12/1988 | Kragelin et al. ............... 364/474.26 |
| 4,949,270 | 8/1990 | Shima et al. .................... 364/474.26 |
| 4,967,189 | 10/1990 | Sumita et al. ................... 364/474.04 |

FOREIGN PATENT DOCUMENTS

| | | | |
|---|---|---|---|
| 0121126 | 5/1989 | Japan .................................. 219/69.13 |
| 0188232 | 7/1989 | Japan .................................. 219/69.13 |
| 0289619 | 11/1989 | Japan .................................. 219/69.13 |

Primary Examiner—Jerry Smith
Assistant Examiner—Thomas E. Brown
Attorney, Agent, or Firm—Sughrue, Mion, Zinn, Macpeak & Seas

[57] ABSTRACT

An electrical discharge machining system is improved by incorporation of an apparatus which permits a machining core to be subdivided into a plurality of sub-cores for separate removal. The invention permits automatic core removal in cases where cores were manually removed in the past, such as where the cores were too large, heavy or irregularly shaped to be handled by the known automatic core disposal apparatus.

4 Claims, 9 Drawing Sheets

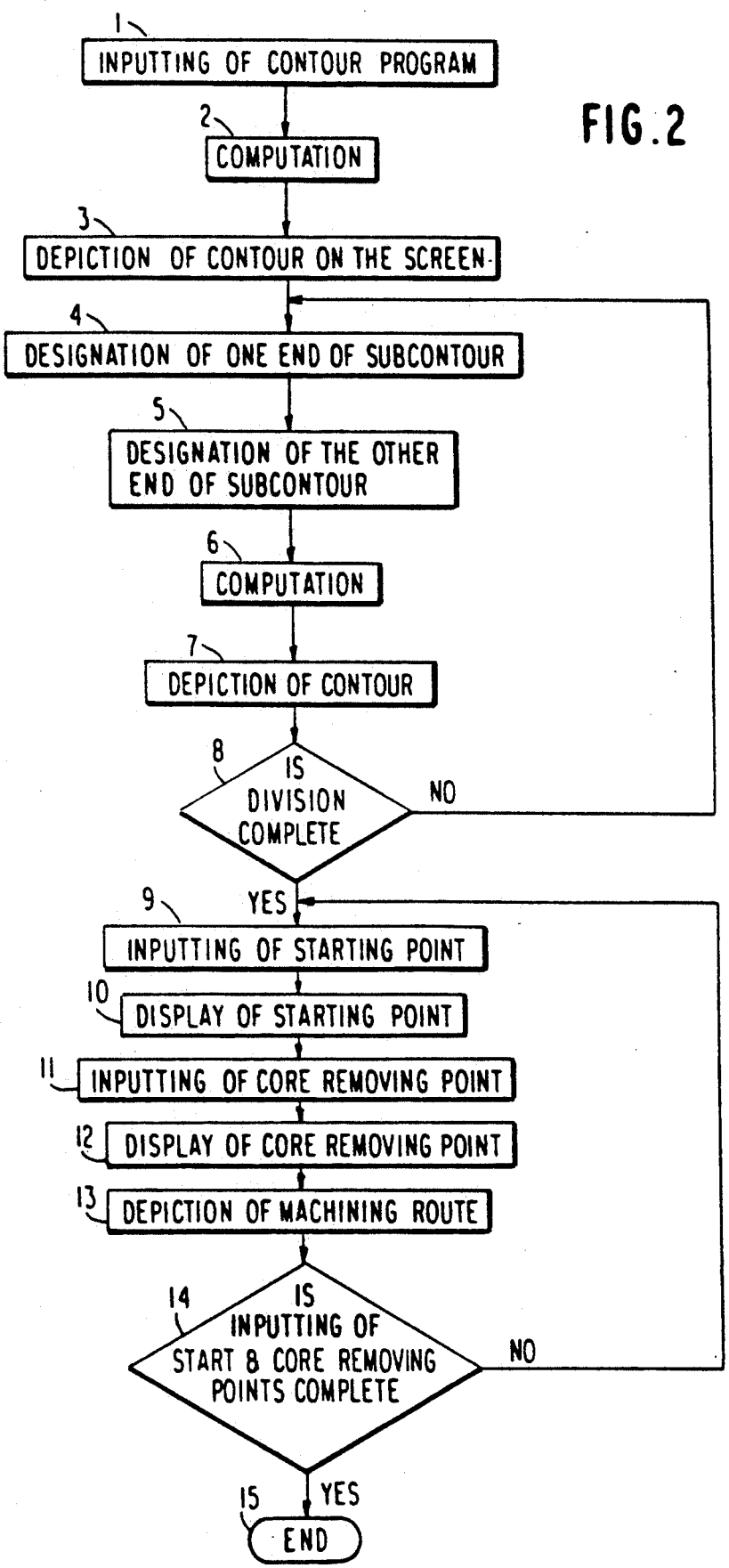

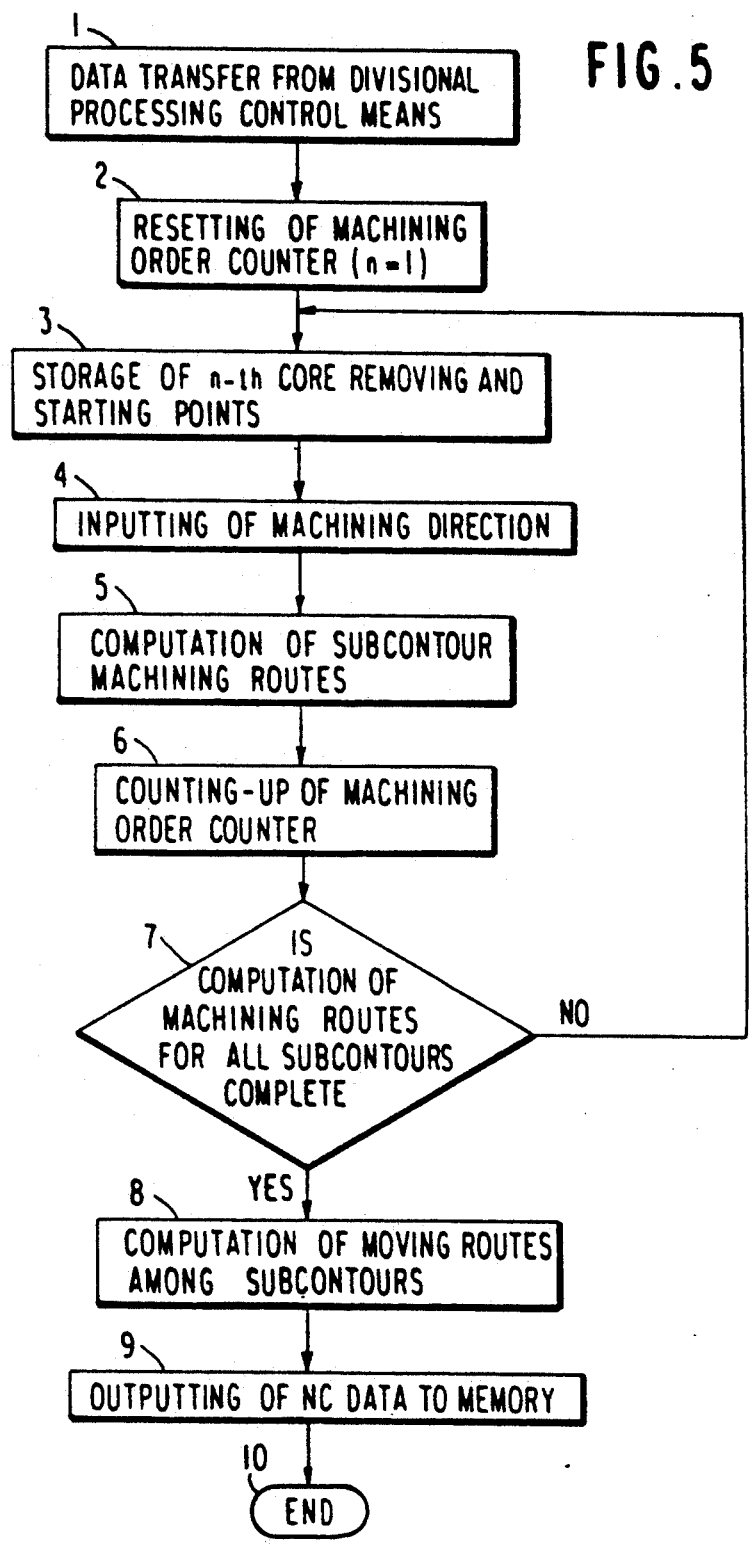

WIRE-TYPE ELECTRICAL DISCHARGE MACHINING METHOD AND APPARATUS

BACKGROUND OF THE INVENTION

The invention relates to a wire-type electric discharge machining method and apparatus capable of reliably removing cores of large size or complicated shape from a workpiece.

FIG. 8 shows a conventional electric discharge machining apparatus equipped with a core removing unit. In this drawing, labelled at 1 is the wire electrode, 2 is the work to be machined, 3 is a table movable in an X-Y plane on which the work 2 is mounted and secured, 4 is an X-axis motor for driving the table 3 in the X direction, 5 is a Y-axis motor for driving the table 3 in the Y direction, 6 is a numerical control unit for, inter alia, actuating the X-axis motor 4 and the Y-axis motor 5 to move the table 3 with respect to the wire electrode 1, 7 is the machining power source for supplying machining current to the gap between the wire electrode 1 and the work 2, and 8 is a core removing unit for removing the core 9 cut from the work 2 by the wire electrode 1.

FIG. 9 shows the main mechanical elements of the core removing unit 8. In this drawing, 10 is a suction head for attracting the core 2. The suction head 10 is secured to one end of a horizontal arm 11, the other end of which is rotatably attached via a bearing 12 to the lower end of an unloading shaft 13. The shaft 13 is made vertically movable with the aid of a mechanism not shown. An upper nozzle 14 supplies machining liquid from above to a machining zone between the wire electrode 1 and the work 2, this upper nozzle 14 being secured to a bracket 16 capable of vertical movement. Lower nozzle 15 supplies machining liquid from below the work 2 to the machining zone, this lower nozzle 15 being secured to a fixed bracket 16.

FIG. 10 shows the work 2 in plan view. In this drawing, 17, 18, 19 and 20 are various contours to be machined by the wire electrode 1, and 21, 22, 23 and 24 are the starting holes through which the wire electrode 1 will be passed.

The operation of this system will now be described. Upon application of a machining voltage from power source 7 across the wire electrode 1 and the work 2, an electric spark is generated in the machining gap formed between them. The X-axis motor 4 and the Y-axis motor 5 are driven in accordance with signals from the numerical control unit 6 so that the table 3 is moved along a given contour, whereby machining is performed. After the completion of machining, the core 9 is removed from the work 2 and taken out.

The process of machining the work 2 into a given shape will now be described.

To machine the contour 17 shown in FIG. 10, the wire electrode 1 is passed through the starting hole 21, machining liquid (not shown) is jetted from the upper nozzle 14 and the lower nozzle 15 to the gap between the wire electrode 1 and the work 2, and the machining voltage is applied across the wire electrode 1 and the work 2 to generate electric discharge.

Under the foregoing conditions, the work 2 is moved such that the trace of the wire electrode 1 advances from the starting hole 21 in the direction of the arrows shown in the drawing, whereby the work 2 is machined so as to have contour 17.

Upon completion of machining corresponding to the contour 17, the core 9 defined by the contour 17 is separated as shown in FIG. 9 while being supported by the lower nozzle 15.

Then, as shown in FIG. 9, the upper nozzle 14 and the bracket 16 thereof are retracted upwardly, and the suction head 10 is positioned in the space between the upper nozzle 14 and the work 2.

That is, the unloading shaft 13 is lowered close to the work 2, the arm 11 is turned, the suction head 10 is positioned (according to positioning information from the numerical controller 6) so as to face the upper side of the core 9, and the suction head 10 is attached to the core 9. The unloading shaft 13 and the suction head 10 are then moved up so that the core 9 is lifted up above the work 2. Then, upon turning the arm 11, the core 9 is moved away from the work 2, and the suction force of the suction head 10 is released, so that the core 9 is disposed of.

Thereafter, machining for the next contour is begun.

Where various contours as shown in FIG. 10 are to be machined, after the contour 17 is subjected to machining and the core 9 is automatically removed, the wire electrode 1 is automatically passed through the starting hole 22, the contour 18 is machined in the same manner as the contour 17, and its core 9 is automatically removed by the core removing unit 8.

Thereafter, in this way, each core 9 is automatically removed by the core removing unit 8; as a result, all the contours 17, 18, 19 and 20 are machined.

With the conventional wire electrospark machining apparatus composed as described above, the core 9 is attracted by the suction head 10, lifted above the work 2, and then taken out. However, the space between the work 2 and the upper nozzle 14 cannot be made large; contrarily, the core removing unit 8 inclusive of the suction head 10 and the arm 11 must be made small in size; thus, the cores which can be removed are limited in both size and weight. For example, a large core having a contour such as at 18 in FIG. 10 cannot be removed automatically, and cores of long and complicated shape such as at 20 tend to interfere with the work 2 when being attracted and lifted, thereby making automatic removal impossible. That is, cores which can be automatically removed are limited. In this example, only the cores of contours 17 and 19 can be removed automatically. Thus, the contours which can be subjected to continuous automatic machining are still limited.

SUMMARY OF THE INVENTION

To solve the foregoing problems, it is an object of the present invention to provide a wire electrospark machining method and apparatus capable of reliably removing any core of any contour thereby enabling automatic performance of continuous machining.

A wire machining method according to the present invention achieves continuous machining by generating an electric spark in a gap between a wire electrode and a work, machining the work along a contour, and automatically removing the core cut through machining by dividing each contour and thus each core into a plurality of sub-contours and sub-cores before machining.

A further wire machining method according to the present invention achieves continuous machining by generating an electric spark in a gap between a wire electrode and a work, machining the work along a contour, and automatically removing a core cut through machining, characterized by the steps of receiving commands to divide a contour defined by a contour program into a desired number of sub-contours and other commands to set a machining starting point and machining termination point of each divided sub-contour, displaying the sub-contours, determining all the machining routes for the sub-contours for which the machining starting points and the machining termination points are set, generating NC data relating to all the machining routes determined, and machining the sub-contours on the basis of the NC data generated.

The wire machining apparatus according to the present invention is characterized by a divisional processing control means for inputting commands to divide a contour defined by a contour program into a desired number of sub-contours and commands to set machining starting points and machining termination points for each divided sub-contour, means for displaying the sub-contours of the contour in accordance with the commands, and means for determining the machining routes of the sub-contours for which the machining starting points and the machining termination points are set, and a machining route generating means for generating NC data relating to the machining routes determined by the divisional processing control means and subjecting each sub-contour to machining on the basis of the NC data generated.

In the first method of the present invention, a contour is divided into a plurality of sub-contours depending on the size and shape of the original contour before machining, and each core cut from a work at completion of machining is automatically removed.

In the second method of the present invention, a contour defined by a contour program is divided into a desired number of sub-contours, a machining starting point and a machining termination point are set for each divided sub-contour, the foregoing is displayed, all the machining routes of the sub-contours for which machining starting points and machining termination points are set are determined, NC data relating to the machining routes is generated, each sub-contour is machined on the basis of the NC data, and each core cut from the work at each completion of sub-contour machining is automatically removed.

In the first apparatus according to the present invention, divisional machining control means divides a contour being machined into a plurality of sub-contours depending on the size and shape of the original contour before machining, and the core removing means automatically removes each core cut from the work at each completion of sub-contour machining.

In the second apparatus according to the present invention, the divisional processing control means, supplied with a command to divide a contour defined by a contour program into a desired number of sub-contours and another command to set machining starting points and machining termination points for each divided sub-contour, displays the divided sub-contours and determines all the machining routes of the sub-contours for which the machining starting points and the machining termination points are set, the machining route generating means generates NC data relating to the machining routes thus determined and subjects each sub-contour to machining on the basis of the NC data, and the core removing means automatically removes each core.

BRIEF DESCRIPTION OF THE DRAWINGS

FIG. 2 is a flowchart showing the order in which commands for dividing the contour of a work and those for designating division starting and core removal points are inputted;

FIG. 5 is a flowchart showing a machining route generating method;

DETAILED DESCRIPTION OF THE PREFERRED EMBODIMENTS

One embodiment of the present invention will now be described with reference to the aforementioned drawings.

Figure 1:
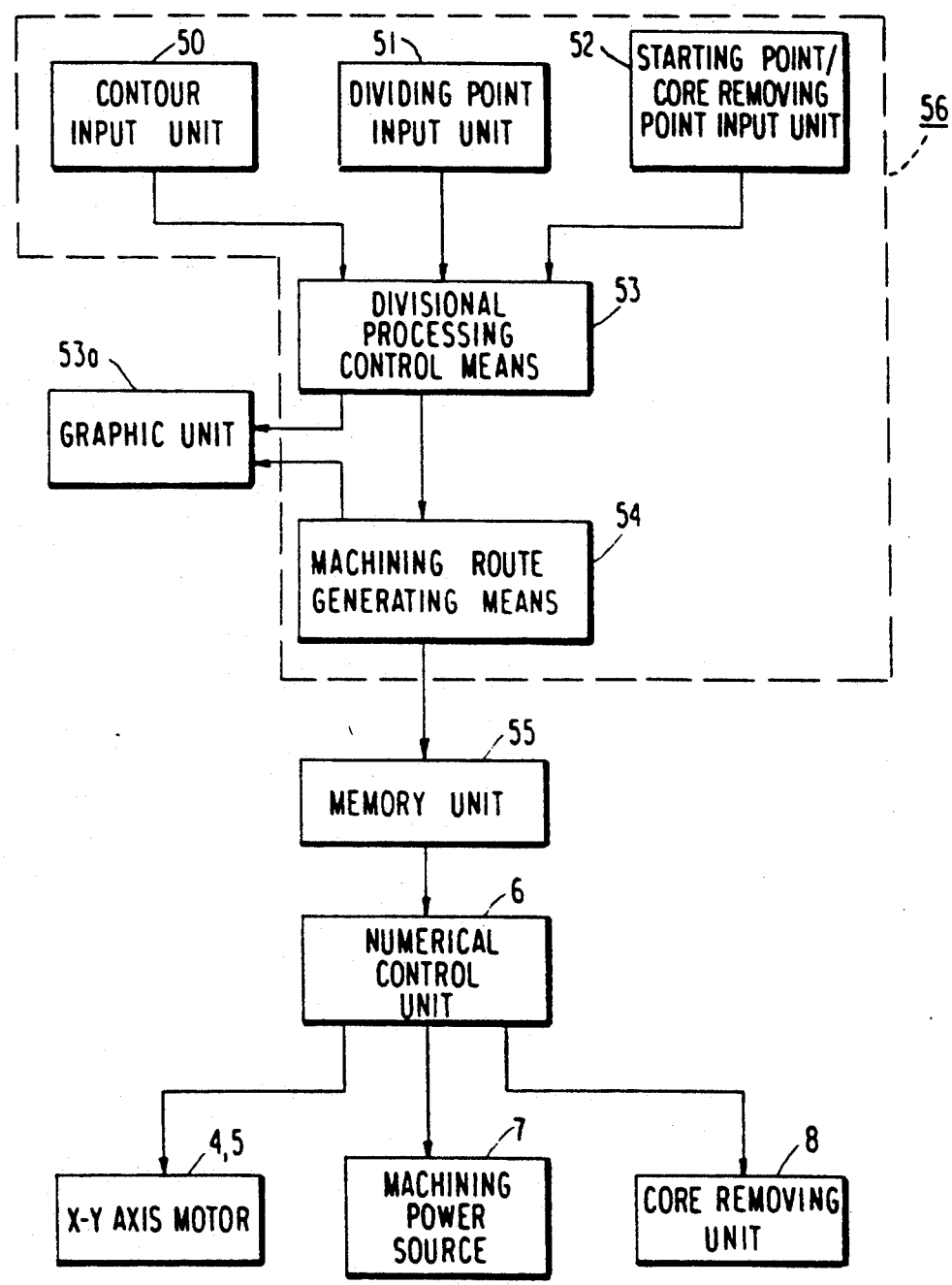
FIG. 1 is a block diagram showing an embodiment of a wire type electric discharge machining apparatus according to the present invention.

In FIG. 1, 50 is a contour input unit for inputting a contour program defining a contour to be machined, 51 is a dividing point input unit for inputting points used in dividing the contour inputted by the contour input unit 50 into a desired number of sub-contours, 52 is a starting point/core removing point input unit for inputting machining starting points and core removing points relating to the individual sub-contours as divided in accordance with data inputted through the dividing point input unit 51, and 53 is a divisional processing control means for processing data input from the contour input unit 50, dividing point input unit 51 and starting point/core removing point input unit 52. Block 53a is a graphic unit or display means for displaying on a screen the output data obtained through the data processing operations performed by the control means 53. Block 54 is a machining route generating means for computing and generating the NC data needed to machine the workpiece, along contours determined on the basis of the output of the control means 53, and 55 is a memory unit for storing the data computed and generated by the machining route generating means 54 and for supplying the stored data to a numerical control unit 6. Numeral 56 designates a divisional machining control means composed of the contour input unit 50, dividing point input unit 51, starting point/core removing point input means 52, control means 53, and machining route generating means 54.

Figure 8:
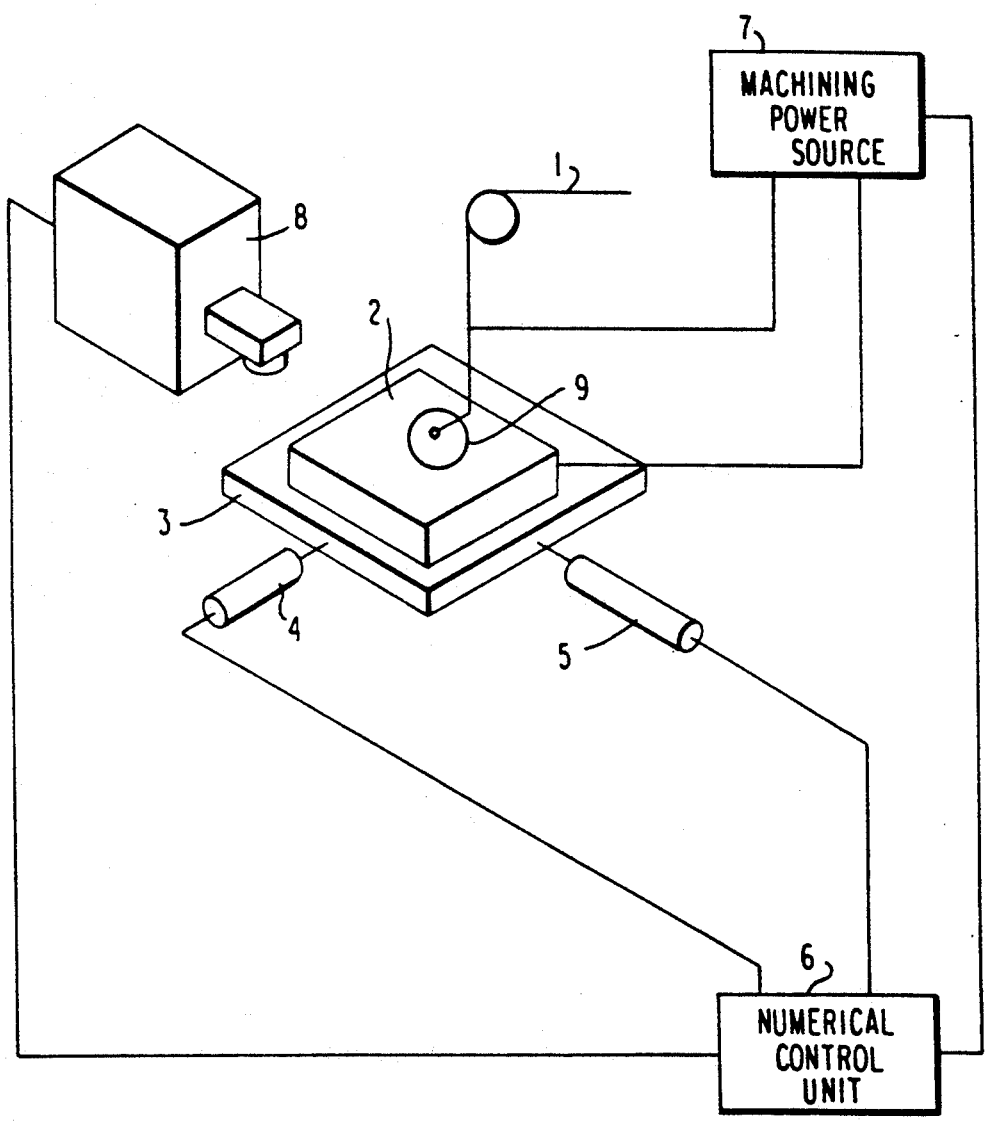
FIG. 8 is a schematic diagram showing a conventional wire machining apparatus.

In FIG. 1, the same reference numerals as used in FIG. 8 showing the conventional apparatus designate the identical components; thus, their descriptions will not be duplicated here.

Figure 10:
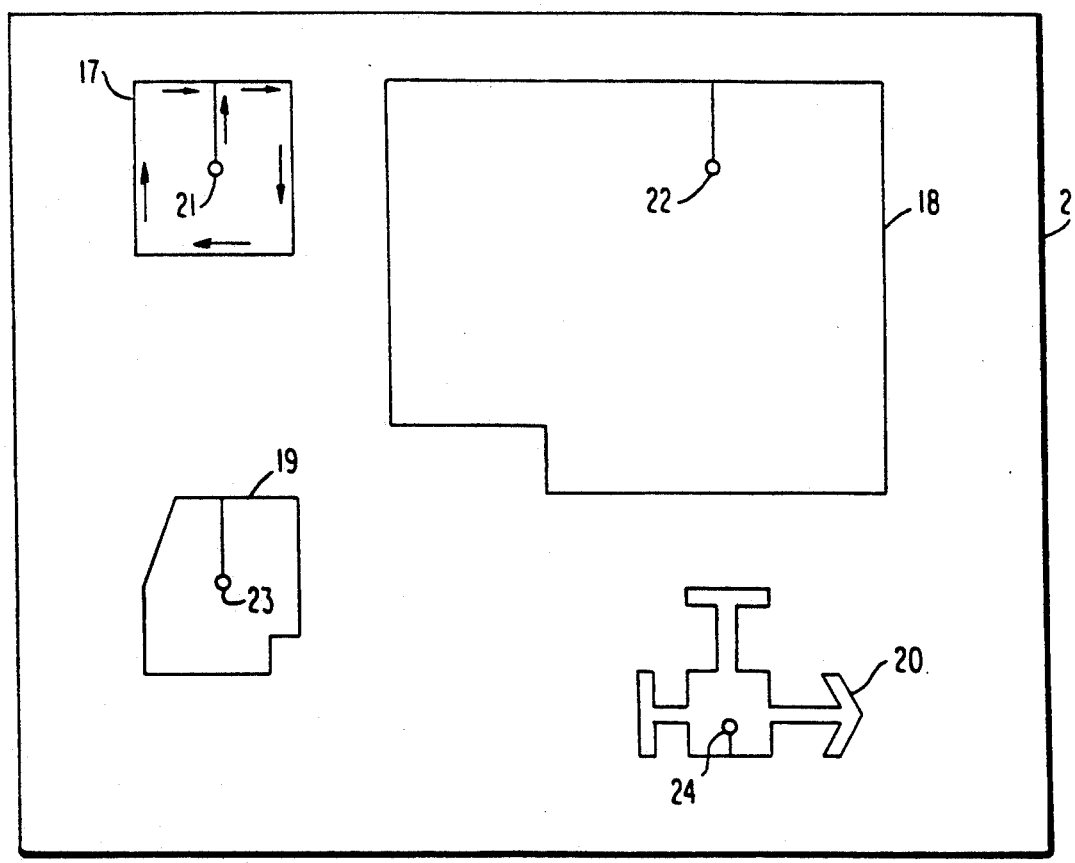
FIG. 10 is a plan view showing a work with various contours to be machined.

The operation of this system will now be described, taking as an example the case where the core 9 being cut through electric discharge machining (as shown in FIG. 10) has a contour 18 of such a large area that it cannot be automatically removed if not divided.

Figure 3A:
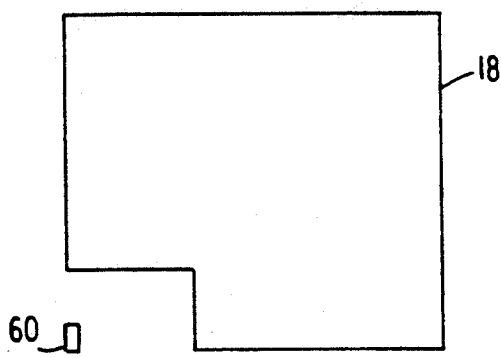
FIGS. 3(a)–3(f) are diagrams explanatory of the procedure of dividing a contour into a plurality of sub-contours.

First, the contour program defining the contour 18 is inputted through the contour input unit 50 into the control means 53. The divisional processing control means 53 processes the data thus received and displays the result on the screen of the graphic unit 53a in the form of the contour shown in FIG. 3(a).

Figure 3B:
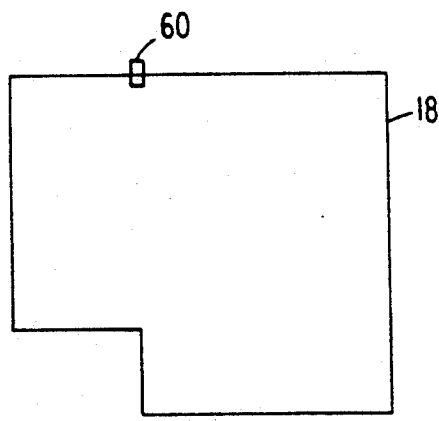
Figure 3C:
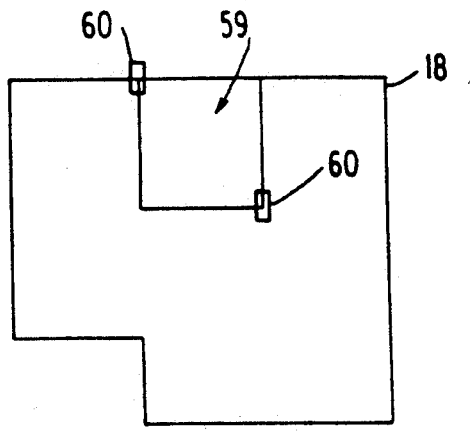
Figure 3D:
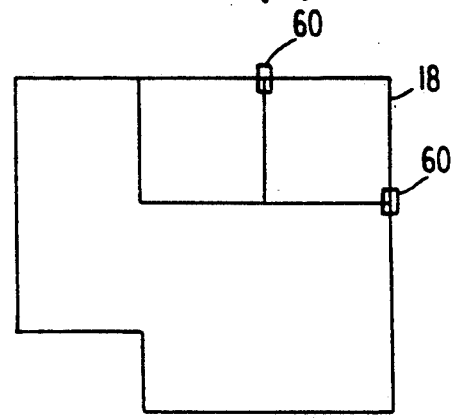
Figure 3E:
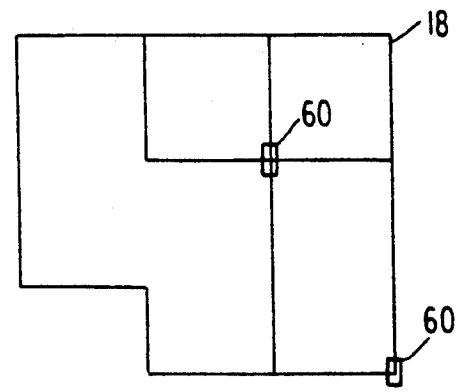
Figure 3F:
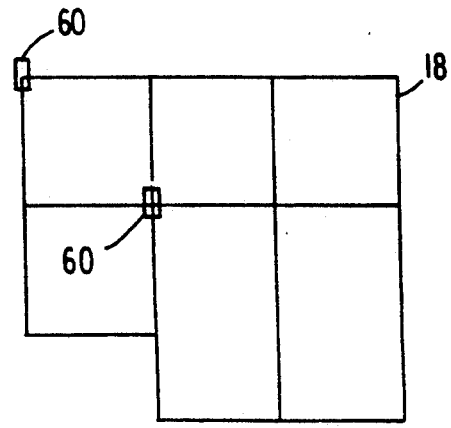

Then, a cursor 60 on the screen of the graphic unit 53a is moved by the operator by means of the dividing point input unit 51 and is located at a position as shown in FIG. 3(b). Upon selection by the operator, this point is stored in the divisional processing control means 53 as the end of one sub-contour. Then, the cursor 60 is moved to a diagonal position as shown in FIG. 3(c), which upon operator selection is then also stored in the divisional processing control means 53, as the other end of the one sub-contour. The divisional processing control means 53 processes the inputted data to divide out a section (subcontour 59) from the contour 18 as shown in FIG. 3(c). Then, similar processing is repeated as illustrated in FIGS. 3(d) and 3(e), until finally, the contour 18 is divided into a plurality of sub-contours (here, 6) as shown in FIG. 3(f). The size of the sub-contours is determined by the operator so that every core 9 can be removed.

Figure 4A:
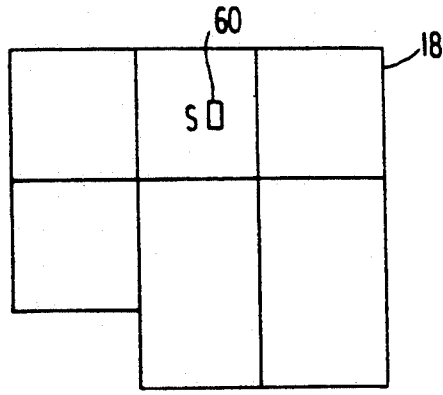
FIGS. 4(a)–4(f) are diagrams explanatory of the procedure of designating a starting point and a core removing point for each sub-contour.

Then, machining starting points and core removing points are set, using the starting point/core removing point input unit 51, in relation to each of the individual sub-contours. (The order of inputting the data on the starting points and the core removing points is as shown in the flowchart of FIG. 2.) Specifically, and as shown in FIG. 4(a), the cursor 60 on the screen of the graphic unit 53a is moved to the position shown, for example, and, upon operator selection a starting point is caused to be stored in the divisional processing control means 53, and a character "S" is displayed at this starting point.

Figure 4D:
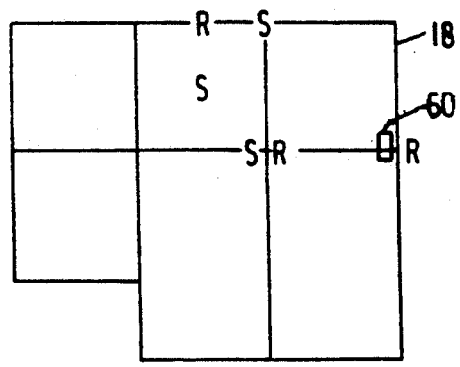
Figure 4B:
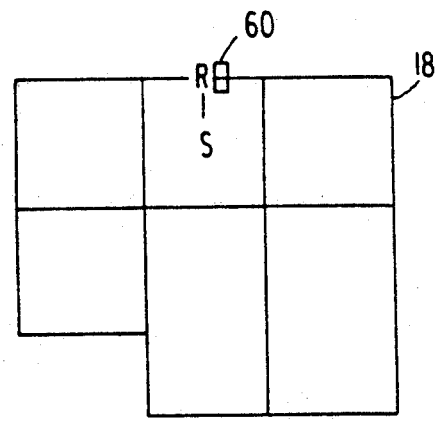
Figure 4E:
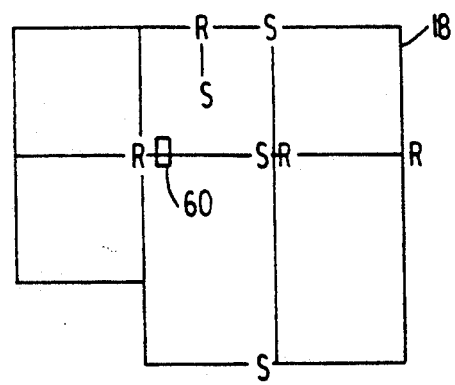
Figure 4C:
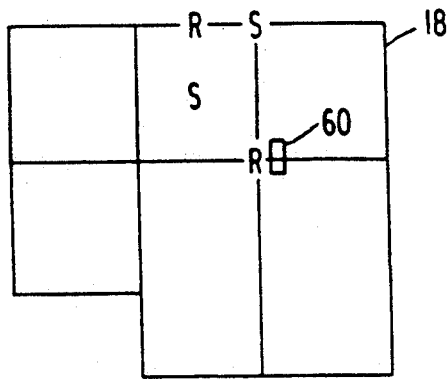
Figure 4F:
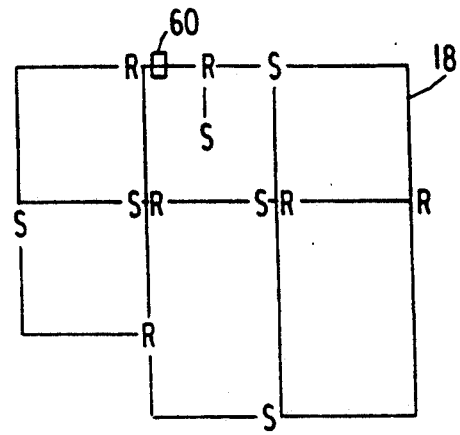

Then, as shown in FIG. 4(b), the cursor 60 on the screen of the graphic unit 53a is moved, for example, to the position shown, a core removing point is selected by the operator and is caused to be stored in the divisional processing control means 53, and a character "R" is displayed at this core removing point, whereby the machining route of the first sub-contour can be determined. (The "core removing point" is the point during machining at which a core has been completely cut and can be removed. It does not indicate the point at which the core is grasped to remove it.) Similar processing is repeated as shown in FIGS. 4(c), 4(d) and 4(e), so that finally, all of the starting points and the core removing points are determined as shown in FIG. 4(f).

The machining route generating procedure operates according to the method shown in FIG. 5. Data is sent from the divisional processing control means 53 to the machining route generating means 54 and an internal machining order counter is reset. The beginning and end points for the first sub-contour to be machined are obtained from the input, from storage or from the screen of the graphic unit 53a. At the same time, a command designating either a clockwise or counter-clockwise machining direction is inputted by the operator, and finally, the machining route for this sub-contour is automatically computed by the machining route generating means 54. This process continues until the moving routes for all the sub-contours are automatically computed. In this process, the route generating means is capable of noting when parts of routes have been previously machined in removing prior cores.

On the basis of the data determined by the machining route generating means 54, NC data is generated which includes the commands for the starting points and core removing points relating to the individual sub-contours. The NC data generated is stored in the memory unit 55.

Thereafter, when machining is begun, the stored NC data is sent to the numerical control unit 6. The machining power source 7, X-axis motor 4, Y-axis motor 5, and/or core removing unit 8 are actuated in accordance with the commands of the NC data; and as a result, the individual sub-contours are machined, the cores are removed, and finally, the machining of the contour 18 is completed.

When machining is started using the NC data generated through the foregoing processing, first, the wire electrode 1 is positioned at a starting point set by the starting point/core removing point input unit 52, and then machining is performed along the associated sub-contour which was divided out by the dividing point input unit 51, using the machining current supplied from the machining power source 7.

When the wire electrode 1 comes to a core removing point as set by the starting point/core removing point input unit 52 as the result of the progress of machining, the core 9 of the given sub-contour is by this point cut from the work 2 and supported by the lower nozzle 15. At this time, a signal is sent to the core removing unit 8 in accordance with a command based on the NC data, and, in response thereto, the core removing unit 8 attracts the core 9, removes it from the work 2, and discards it.

The foregoing processing is repeated to complete the machining of the contour 18.

The process of machining each sub-contour will now be described in greater detail.

Figure 6A:
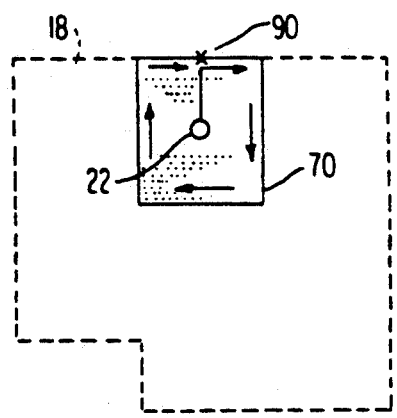
FIGS. 6(a)–6(f) are diagrams explanatory of the process of machining a contour.
Figure 6D:
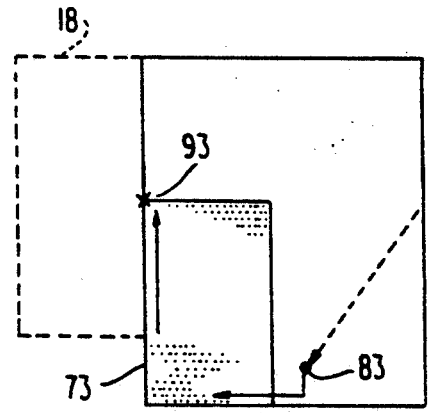

In the first machining step, as shown in FIG. 6(a), a starting hole 22 is bored in an upper central portion inside the contour 18 at the starting point set by the starting point/core removing point input unit 52. The wire electrode 1 (not shown) is automatically passed through this starting hole in a known manner. The wire electrode 1 is moved in the direction of the arrows shown in the drawing along a sub-contour 70 is accordance with the NC data for this sub-contour generated by the machining route generating means 54 and stored in the memory unit 55, while machining is performed by means of the machining current supplied from the machining power source 7. When machining advances to the core removing point, i.e. the machining termination point, set by the operator via the starting point/core removing point input unit 52, the core of the sub-contour 70 (the dotted portion in the drawing) has been cut from the work 2 and is supported by the lower nozzle 15 shown in FIG. 9.

Subsequently, the core 9 supported by the lower nozzle 15 is attracted, removed from the work 2 and disposed of by the core removing unit 8.

Figure 6B:
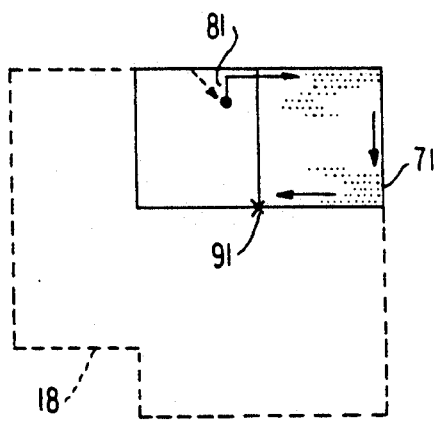
Figure 6E:
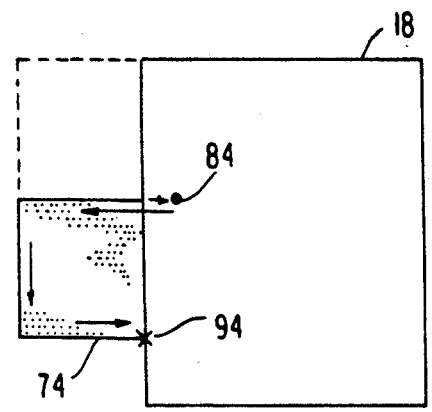
Figure 6C:
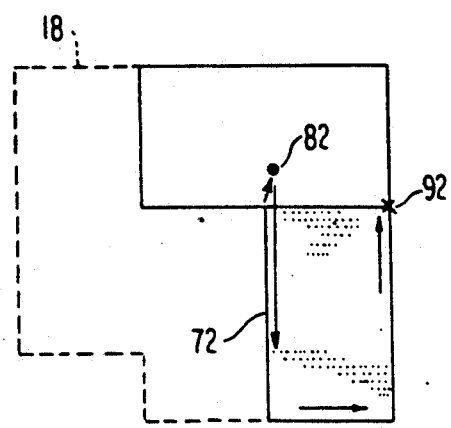
Figure 6F:
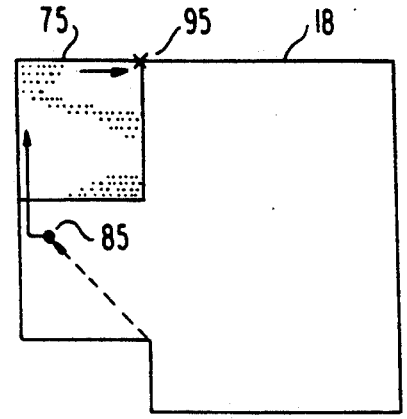

Then, in a second machining step, as shown in FIG. 6(b), the wire electrode 1 is moved to a starting point 81 which is inside the sub-contour 70 which has just been machined, and the next sub-contour 71 adjacent on the right side to the sub-contour 70 is machined in the direction of the arrows shown in the drawing in accordance with the NC data stored on this sub-contour. When machining advances to the set machining termination point 91, the core 71 (the dotted portion in the drawing) is cut from the work 2 and is supported by the lower nozzle 15.

Subsequently, the core is removed from the work 2 and taken out by the core removing unit 8.

Thereafter, similarly, in third through sixth machining steps as shown in FIGS. 6(c) through 6(f), machining is performed from starting points 82, 83, 84 and 85 to machining termination points 92, 93, 94 and 95. At the time the machining termination point 95 is reached and the core of the sub-contour 75 is removed from the work 2, machining of the contour 18 is complete.

The process of machining a long and complicated contour 20 as shown in FIG. 10 will now be described.

The contour 20 of FIG. 7 corresponds to the contour 20 shown in FIG. 10.

In this case, machining is performed after the contour 20 is divided into four.

Figure 7A:
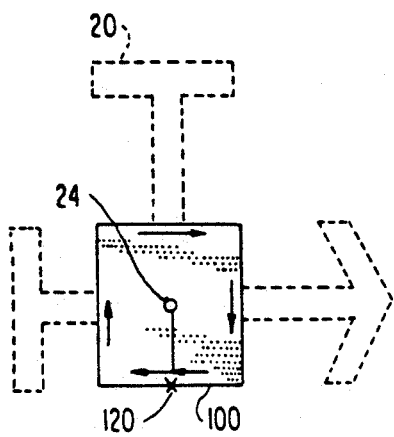
FIGS. 7(a)–7(e) are diagrams explanatory of the process of machining a different contour.

In the first machining step, as shown in FIG. 7(a), a starting hole 24 is bored at a starting point inside a central sub-contour 100 of the contour 20 that has been set by the starting point/core removing point input unit 52, the wire electrode 1 (not shown) is automatically passed through this starting hole, and while moving the wire electrode 1 in the direction of the arrows shown in the drawing along the sub-contour 100 in accordance with the NC data of the sub-contour 100 generated by the machining route generating means 54 and stored in the memory unit 55, machining is performed by means of the machining current supplied from the machining power source 7.

Figure 9:
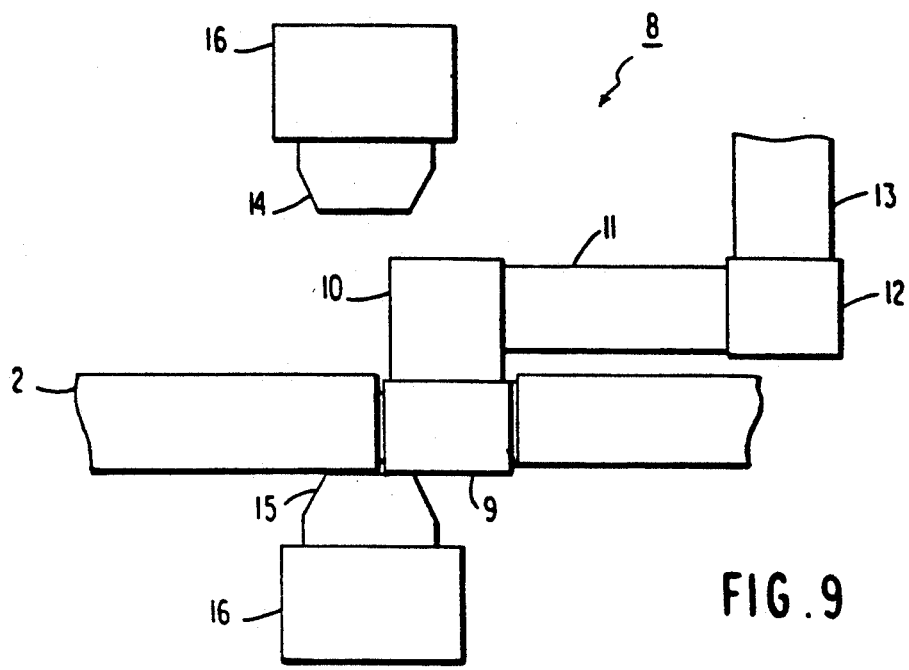
FIG. 9 is a schematic diagram showing a core removing unit of the conventional wire machining apparatus.

When machining advances to a core removing point, i.e. a machining termination point 120, set by the starting point/core point input unit 52, the core of the sub-contour 100 is cut from the work 2 and supported by the lower nozzle 15 as shown in FIG. 9.

Subsequently, the core 9 supported by the lower nozzle 15 is attracted and removed from the work 2.

Figure 7B:
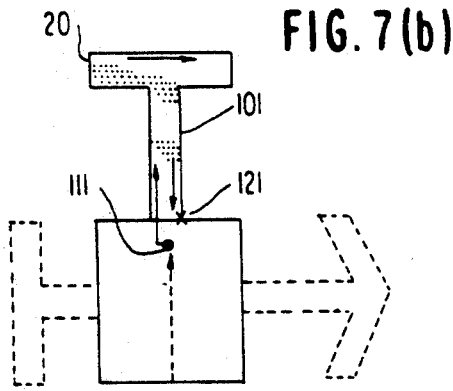

Then, in a second machining step, as shown in FIG. 7(b), the wire electrode 1 is moved to starting point 111 inside the sub-contour 100, and similarly, a sub-contour 101 on the upper side of the sub-contour 100 is machined in the direction of the arrows shown in the drawing in accordance with the NC data stored on the subcontour 101. When machining advances to set machining termination point 121, the core of the sub-contour 101 is cut from the work 2 and supported by the lower nozzle 15, after which it is attracted and removed from the work.

Figure 7C:
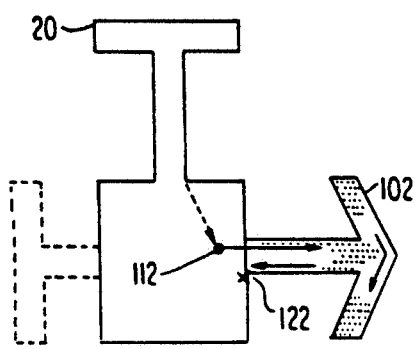
Figure 7D:
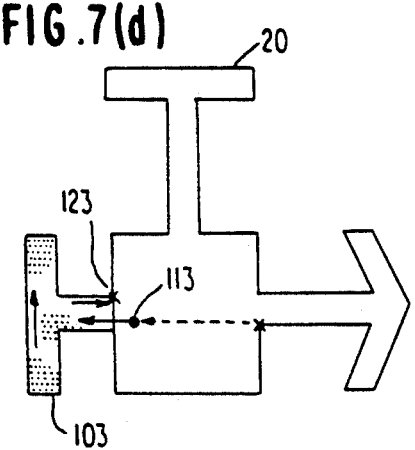

In third and fourth machining steps as shown in FIGS. 7(c) and 7(d), machining is similarly performed from starting points 112 and 113 to machining termination points 122 and 123. When machining to the termination point 123 is completed, the core 103 is removed from the work 2 and machining of the contour 20 is complete.

Figure 7E:
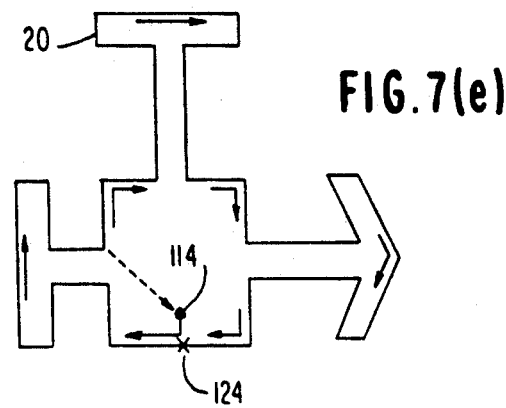

If necessary, precise machining may be performed in a fifth machining step (a finishing step) as shown in FIG. 7(e). In this case, the wire electrode 1 is moved from a starting point 114 in the direction of the arrows shown in the drawing, and machining is terminated at a machining termination point 124, whereby precise machining can be readily attained and a contour 20 of high accuracy can be obtained.

Although the contours 18 or 20 as described were divided into 6 or 4 cores, the number of divisions can be freely selected according to need.

Although in the illustrated embodiment, the output of the machining route generating means 54 is stored in the memory unit 55, such a facility is not necessarily required, and the same effect can be obtained if the output of means 54 is delivered to the numerical control unit 6.

As described above, the present invention divides large or oddly shaped contours into a plurality of subcontours such that the cores of the subcontours can be readily removed, and successively machines these subcontours. Thus, even when machining a large contour whose core is difficult to remove or a complicated contour, the present invention can surely and automatically remove each core cut from a work through machining, and can continuously and automatically machine any contour.

What is claimed is:

1. A method of achieving continuous discharge-type machining, comprising the steps of:
    determining a machining contour to be cut within a workpiece, said contour defining a core;
    dividing said contour into a plurality of subcontours, each defining a subcore of smaller size than said core;
    automatically generating a machining route for each of said subcontours;
    machining said workpiece by generating an electrical discharge in a gap maintained between said workpiece and said core in a subcontour-by-subcontour manner; and
    automatically removing each subcore as the machining of the associated subcontour is completed, wherein said step of generating a machining route for each of said subcontours further includes the step of generating NC data relating to the machining of each of said subcontours.

2. A method of achieving continuous discharge-type machining, comprising the steps of:
    determining a machining contour to be cut within a workpiece, said contour defining a core;
    dividing said contour into a plurality of subcontours, each defining a subcore of smaller size than said core, said dividing step comprising the steps of setting boundary points for each said subcontour, and setting machining start and end points for each of said subcontours;
    automatically generating a machining route for each of said subcontours;
    machining said workpiece by generating an electrical discharge in a gap maintained between said workpiece and said core in a subcontour-by-subcontour manner; and
    automatically removing each subcore as the machining of the associated subcontour is completed, wherein said step of generating a machining route for each of said subcontours further includes the step of generating NC data relating to the machining of each of said subcontours.

3. An apparatus for achieving continuous discharge-type machining, comprising:
    means for setting a machining contour to be cut within a workpiece, said contour defining a core;
    means for dividing said contour into a plurality of subcontours, each defining a subcore of smaller size than said core;
    means for automatically generating a machining route for each of said subcontours; means for machining said workpiece by generating an electrical discharge in a gap maintained between said workpiece and said core in a subcontour-by subcontour manner; and
    means for automatically removing each subcore as the machining of the associated subcontour is completed, wherein said means for generating a machining route for each of said subcontours further comprises means for generating NC data relating to the machining of said subcontours.

4. An apparatus for achieving continuous discharge-type machining, comprising:

means for setting a machining contour to be cut within a workpiece, said contour defining a core;

means for dividing said contour into a plurality of subcontours, each defining a subcore of smaller size than said core said means for dividing comprising means for setting boundary points for each said subcontour, and means for setting machining start and end points for each of said subcontours;

means for automatically generating a machining route for each of said subcontours;

means for machining sad workpiece by generating an electrical discharge in a gap maintained between said workpiece and said core in a subcontour-by-subcontour manner; and means for automatically removing each subcore as the machining of the associated subcontour is completed, wherein said means for generating a machining route for each of said subcontours further includes means for generating NC data relating to the machining of each of said subcontours.

* * * * *